Figure 1:
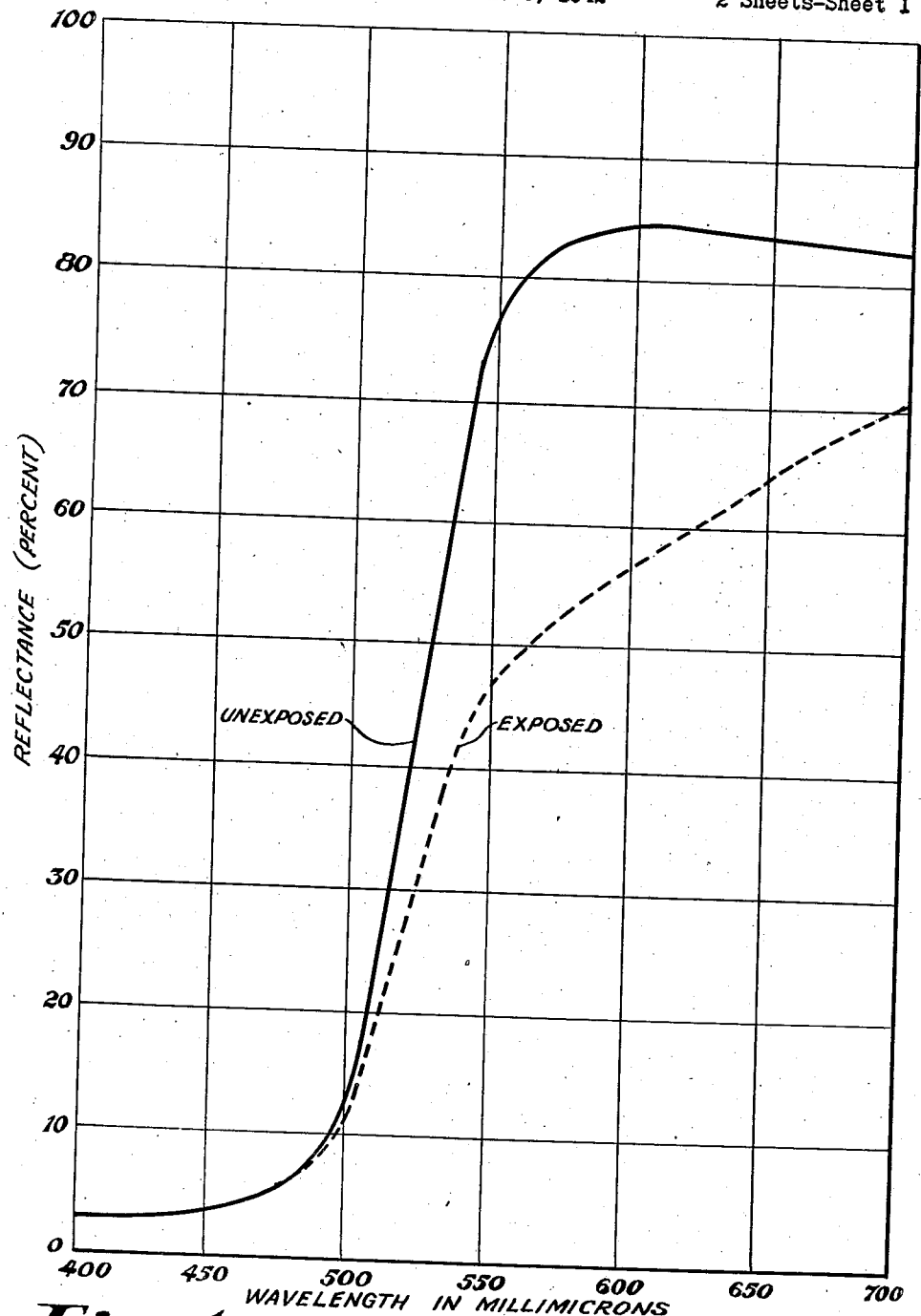

Dec. 19, 1944.  E. C. BOTTI  2,365,171
LEAD CHROMATE PIGMENT PRODUCTION
Filed June 3, 1942  2 Sheets-Sheet 1

(EXAMPLE I. UNTREATED LEAD CHROMATE)

Edmond C. Botti INVENTOR
BY John P. Hancock
ATTORNEY (EXAMPLE I. TREATED LEAD CHROMATE)

Patented Dec. 19, 1944

2,365,171

UNITED STATES PATENT OFFICE 2,365,171

LEAD CHROMATE PIGMENT PRODUCTION

Edmond Charles Botti, Brooklyn, N. Y., assignor to E. I. du Pont de Nemours & Company, Wilmington, Del., a corporation of Delaware Application June 3, 1942, Serial No. 445,628

20 Claims. (Cl. 106—298)

This invention relates to the production of improved lead chromate pigments, and more particularly to the manufacture of chrome yellow pigments of improved light-fastness.

Lead chromate pigments are known to darken under the influence of light. Although amongst prior art pigments of this type, wide differences in degree of this property exist, the characteristic still remains a serious disadvantage which limits the use of these pigments in many cases. Furthermore, this effect appears to be substantially progressive in the pigment and continues to grow worse for a long period of time at best. To improve the light-fastness, or, more properly, the resistance to darkening under the influence of light of lead chromate pigments, it has been proposed to treat such pigments with alumina hydrate. This treating agent is usually added to the final pigment by incorporating a soluble aluminum salt, such as aluminum sulfate, in the finished slurry of the pigment, followed by precipitation with an alkaline agent. It has likewise been proposed to treat lead chromate pigments with hydrous oxides of other metals, particularly titanium and tin, in order to improve their resistance to darkening.

Although these treating agents do effect some improvement in the resistance of lead chromate pigments to darkening under the influence of light, the resulting pigments still lack satisfactory resistance in this respect and further improvements in their light-fastness characteristics have been long sought after by the art.

The lack of resistance of a lead chromate pigment to darkening under the influence of light is a characteristic of the pigment which becomes most noticeable only during the practical use of the pigment. Lead chromate pigments, for the most part, are employed as coloring ingredients for various compositions wherein dispersion of the pigment throughout a suitable vehicle or binder is had. Common compositions comprise those employing vehicles of an oily nature, such as linseed oil and its derivatives, synthetic resins of the alkyd type, phenol formaldehyde resins, urea formaldehyde resins, and other products of a similar character. These compositions are used principally in paints, enamels, finishes, lacquers, printing inks and the like. Many other suitable vehicles are known but all have the common function of serving as a binder for the pigment particles. Although the vehicle may modify the properties of the pigment to some extent, such fundamental lead chromate properties as color, light-fastness, etc., are substantially independent of the vehicle in which the pigment may be used.

It is among the objects of this invention to overcome the existing disadvantages of prior lead chromate pigments, particularly their lack of desired light-fastness characteristics and to provide an improved novel type of lead chromate pigment which is relatively free from such disadvantages. A further object includes the provision of novel methods for obtaining such improved pigment, while a special object is to provide a lead chromate, chrome yellow or chrome green pigment of such greatly improved light-fastness and other essential properties as to be readily adaptable for use in all types of chrome pigment applications. Other objects and advantages of the invention will be apparent from the ensuing description.

These and other objects are attainable in this invention which embodies the discovery that if a lead chromate pigment is treated with one or more compounds, preferably hydrous oxides, of elements from the group consisting of aluminum, and the fourth group elements of the periodic table which yield substantially insoluble, white oxides, together with a substantially insoluble, colorless compound of a lanthanide or third group metal of the rare earth type, quite unexpectedly the characteristics of the lead chromate, especially its resistance to darkening under the influence of light, become greatly improved.

In a more specific and preferred embodiment, the invention comprises improving the light-resistance characteristics of a precipitated lead chromate, chrome yellow or chrome green pigment by treating said pigment with relatively small amounts of the freshly precipitated, finely divided, hydrous oxides of aluminum and titanium, together with one or more freshly precipitated, hydrous oxides of a metal of the rare earth elements.

I shall now describe my invention as applied to one practical and preferred adaptation thereof, but it will be understood that it is not to be construed as limited thereto. For example, a normal or basic lead chromate pigment is conventionally precipitated, in accordance with, for example, the methods referred to in U. S. Patent 2,212,917, by reacting a solution of a water-soluble, organic or inorganic lead salt (nitrate, acetate, chloride, basic lead acetate, etc.) with a soluble chromate or dichromate of an alkali metal (sodium or potassium mono or dichromates, etc.) followed by washing, such as decantation or otherwise, to purify the same and render it substantially free of soluble or residual salts. To the pigment slurry which results, I successively add a solution of aluminum sulfate, a solution of titanyl sulfate, and a solution of cerium acetate, or, preferably, a mixture of rare earth acetates, especially those commercially marketed as "rare earth acetate." Precipitation of the hydrous oxides of these elements onto the pigment to coat the particles thereof is then effected by adding to said slurry a sufficient amount of a suitable alkaline agent or basic precipitant such as alkali metal carbonates or hydroxides and preferably sodium carbonate. The amount of precipitant so used is preferably sufficient to raise the pH of the suspension to within a range of about 5.0 to 6.5. The treating agents are used in such an amount that the final pigment will contain, preferably, approximately 2% of alumina hydrate, calculated as $Al(OH)_3$, 1% of hydrous titanium oxide, calculated as $TiO_2$, and 3% of hydrous cerium oxide, calculated as $CeO_2$, and based on the dry weight of the finished pigment. The resulting slurry is then suitably diluted with water and the precipitate washed by decantation, filtered and dried to recover the final product. The improved resistance to darkening under the influence of light which said product exhibits over an untreated control will be readily apparent and can be determined by spectral reflectance in accordance with the methods hereinafter more particularly described.

To a clearer understanding of the invention, the following specific examples are given, each being merely illustrative of, and not to be considered as limiting the underlying principles of the invention:

Example I

To a solution of 165.5 gms. of lead nitrate in 1 liter of water is added 200 ml. of a solution containing 24 gms. of soda ash and after stirring for 20 minutes the volume is adjusted to 1500 ml. at 21° C. To this mixture is added over a period of 30 minutes 500 ml. of a solution containing 52.5 gms. of sodium bichromate and 12.5 gms. of anhydrous sodium sulphate. There is then added 200 ml. of a solution containing 5 gms. of anhydrous sodium sulphate and the volume is then increased to 10 liters and the precipitate washed twice by decantation. A solution of 8 gms. of aluminum sulphate $(Al_2(SO_4)_3.18H_2O)$ is added to the washed slurry followed by a solution of $TiOSO_4$ equivalent to 1.6 gms. $TiO_2$ and then followed by a solution containing 10 gms. of cerium nitrate $(Ce(NO_3)_3.6H_2O)$. Soda ash (9.4 gms.) is finally added to give a pH of 6.3. The volume is made to 10 liters and the precipitate washed once by decantation, filtered and dried, from which 167 gms. of a light yellow pigment is obtained. The treatment resulted in a pigment exhibiting substantially improved resistance toward darkening on exposure to light.

Example II

To a solution of 165.5 grams of lead nitrate in 1 liter of water is added 200 ml. of a solution containing 24 gms. of soda ash and after stirring for 20 minutes the volume is adjusted to 1500 ml. at 21° C. To this is added over a period of 30 minutes 500 ml. of a solution containing 52.5 gms. of sodium bichromate and 12.5 gms. of anhydrous sodium sulphate. There is then added 200 ml. of a solution containing 5 gms. of anhydrous sodium sulphate and the volume is then increased to 10 liters and the precipitate washed twice by decantation. To the washed slurry is added a solution of $TiOSO_4$ equivalent to 1.6 gms. $TiO_2$ which is then followed by a solution containing 10 gms. of cerium nitrate $(Ce(NO_3)_3.6H_2O)$. The slurry is neutralized to a pH of 6.3 with approximately 4 gms. of soda ash. The pigment slurry is then diluted to 10 liters and the precipitate washed once by decantation, filtered and dried. 164 gms. of a light yellow pigment are obtained. The light-fastness is greatly improved over a pigment which was not treated with cerium nitrate.

Example III

To one liter of a solution of basic lead acetate containing the equivalent of 111.5 gms. of lead oxide (PbO) and 20.13 gms. of acetic acid is added 42.5 gms. of dry sodium bicarbonate and the mixture is stirred for 1 hour and then flooded to a volume of 8 liters. The precipitate is washed twice by decantation and the final volume adjusted to 1.5 liters at 21° C. 22.5 gms. of 100% nitric acid is then added followed by a solution of 41 gms. of sodium bichromate and 17.5 gms. of 100% sulfuric acid in 500 ml. in 5 minutes. There is then added 8 gms. of aluminum sulphate $(Al_2(SO_4)_3.18H_2O)$ in 100 ml. of water followed by a solution of $TiOSO_4$ containing the equivalent of 1.6 gms. of $TiO_2$. A solution containing 10 gms. of cerium nitrate $(Ce(NO_3)_3.6H_2O)$ is added immediately, followed by soda ash (14 gms.) to give a pH of 5.8. The volume is increased to 10 liters and the precipitate washed once by decantation and, after filtering and drying, 165 gms. of a light chrome yellow of improved light-fastness is obtained.

Example IV

To 149 gms. of lead nitrate in 4 liters of waters at 38° C. is added, in the following manner, 1800 ml. of a solution containing 73 gms. of anhydrous sodium chromate and 1.4 gms. of caustic soda: the 1800 ml. of solution are split into two portions and each portion is added to the lead nitrate in 10 minutes with a stirring period of 20 minutes between each portion. The volume is then increased to 10 liters and the precipitate washed four times by decantation.

A solution of 7 gms. of aluminum sulphate $(Al_2(SO_4)_3.18H_2O)$ is added to the washed slurry followed by 1.4 gms. of $TiO_2$ as $TiOSO_4$. There is then added 9 gms. of cerium nitrate $$(Ce(NO_3)_3.6H_2O)$$

in 150 ml. of water and the mixture is then adjusted to a pH of 6.4 with 8 gms. of soda ash. The volume is made to 10 liters and the precipitate washed once by decantation. After filtering and drying, 153 gms. of a strong, brilliant medium yellow is obtained. The treatment results in a substantial improvement in resistance to darkening on exposure to light.

Example V

To 149 gms. of lead nitrate in 4 liters of water at 38° C. is added, in the following manner, 1800 ml. of a solution containing 73 gms. of anhydrous sodium chromate and 1.4 gms. of caustic soda: the 1800 ml. of solution are split into two portions and each portion is added to the lead nitrate in 10 minutes with a stirring period of 20 minutes between each portion. The volume is then increased to 10 liters and the precipitate washed four times by decantation.

To the pigment slurry is added a solution containing 7 gms. of aluminum sulphate $$(Al_2(SO_4)_3.18H_2O)$$

followed by 9 gms. of cerium nitrate $$(Ce(NO_3)_3.6H_2O)$$

in 150 ml. of water. The slurry is neutralized to a pH of 6.4 with approximately 4 gms. of soda ash and is then diluted to 10 liters. After decantation, the pigment is filtered and dried giving 150 gms. of a medium chrome yellow of improved light-fastness.

Example VI

To 149 gms. of lead nitrate in 4 liters of water at 38° C. is added, in the following manner, 1800 ml. of a solution containing 73 gms. of anhydrous sodium chromate and 1.4 gms. of caustic soda: the 1800 ml. of solution are split into two portions and each portion is added to the lead nitrate in 10 minutes with a stirring period of 20 minutes between each portion. The volume is then increased to 10 liters and the precipitate washed four times by decantation.

A solution of 7 gms. of aluminum sulphate (Al$_2$(SO$_4$)$_3$.18H$_2$O) is added to the washed slurry followed by 1.4 gms. of TiO$_2$ as TiOSO$_4$. There is then added 9 gms. of rare earth acetate in 150 ml. of water and the mixture is then adjusted to a pH of 6.3 with 11 gms. of soda ash. The volume is made to 10 liters and the precipitate washed once by decantation. After filtering and drying 153 gms. of a strong, brilliant medium yellow of improved light-fastness is obtained.

Example VII

To 149 gms. of lead nitrate in 4 liters of water at 38° C. is added, in the following manner, 1800 ml. of a solution containing 73 gms. of anhydrous sodium chromate and 1.4 gms. of caustic soda: the 1800 ml. of solution are split into two portions and each portion is added to the lead nitrate in 10 minutes with a stirring period of 20 minutes between each portion. The volume is then increased to 10 liters and the precipitate washed four times by decantation.

To the pigment slurry is added a solution containing 7 gms. of aluminum sulphate $$(Al_2(SO_4)_3.18H_2O)$$

followed by 9 gms. of rare earth acetate in 150 ml. of water. The slurry is neutralized to a pH of 6.2 with approximately 6 gms. of soda ash and is then diluted to 10 liters. After decantation, the pigment is filtered and dried, giving 151 gms. of a medium chrome yellow of improved light-fastness.

Example VIII

To 149 gms. of lead nitrate in 4 liters of water at 38° C. is added, in the following manner, 1800 ml. of a solution containing 73 gms. of anhydrous sodium chromate and 1.4 gms. of caustic soda: the 1800 ml. of solution are split into two portions and each portion is added to the lead nitrate in 10 minutes with a stirring period of 20 minutes between each portion. The volume is then increased to 10 liters and the precipitate washed four times by decantation.

A solution of titanyl sulfate equivalent to 1.4 gms. of TiO$_2$ is then added to the washed slurry followed by 150 ml. of a solution containing 9 gms. of rare earth acetate. The slurry is then adjusted to a pH of 6.1 with a solution of 7.3 gms. of soda ash in 100 ml. of water. After dilution to 10 liters the wash water is decanted and the pigment is filtered and dried, resulting in a yield of 151 gms. of medium chrome yellow.

Example IX

To 149 gms. of lead nitrate in 4 liters of water at 38° C. is added, in the following manner, 1800 ml. of a solution containing 73 gms. of anhydrous sodium chromate and 1.4 gms. of caustic soda: the 1800 ml. of solution are split into two portions and each portion is added to the lead nitrate in 10 minutes with a stirring period of 20 minutes between each portion. The volume is then increased to 10 liters and the precipitate washed four times by decantation.

A solution of 7 gms. of aluminum sulphate (Al$_2$(SO$_4$)$_3$.18H$_2$O) is added to the washed slurry followed by a solution of TiOSO$_4$ equivalent to 1.4 gms. of TiO$_2$. The slurry is neutralized to a pH of 5.3 with 7.5 gms. of soda ash. Freshly precipitated cerium hydroxide (made by dissolving 9 gms. of Ce nitrate in 200 cc. of water, adding dilute ammonium hydroxide until precipitation is complete and washing by decantation) is added to the pigment slurry which is stirred for 5 minutes. The volume is then diluted to 10 liters, decanted once and the pigment filtered and dried. Yield—150 gms. of medium chrome yellow.

Example X

Example IX is duplicated, except rare earth carbonate (made by dissolving 9 gms. of rare earth acetate in 200 cc. of water, adding solution of soda ash until precipitation is complete, and washing by decantation) is substituted for cerium hydroxide. A yield of 153 gms. of medium chrome yellow results.

Example XI

A solution of basic lead acetate, containing the equivalent of 54 gms. of lead oxide (PbO) and 9.85 gms. of acetic acid, is treated with 16 gms. of sodium bicarbonate and the mixture is stirred for 20 minutes. The precipitate is washed twice by decantation, 85.5 gms. of lead nitrate is added together with 2 gms. of rare earth acetate, and the final volume then adjusted to 1.5 liters at 24° C. To this mixture is added in 30 minutes a solution of 62.5 gms. of sodium bichromate and 10 gms. of aluminum sulfate (Al$_2$(SO$_4$)$_3$.18H$_2$O) in 500 cc. There is then immediately added a solution of 5 gms. of rare earth acetate followed by 6 gms. of aluminum sulfate $$(Al_2(SO_4)_3.18H_2O)$$

in 100 cc. A solution consisting of 14.5 gms. of secondary sodium phosphate $$(Na_2HPO_4.12H_2O)$$

and 1.5 gms. of soda ash in 200 cc. is added and the pigment slurry is then adjusted to a pH of 5.2 with 2.4 gms. of soda ash. The volume is made to 8 liters and the precipitate washed three times by decantation, filtered and dried, to give 164 gms. of a lemon yellow pigment of greatly improved lightfastness as compared to a similar pigment prepared without the use of the rare earth acetate.

Example XII

To a solution of 165.5 gms. of lead nitrate in 1½ liters of water at 21° C. is added 200 cc. of a solution containing 18 gms. of soda ash. After stirring for 15 minutes, the pigment is precipitated by adding with agitation over a period of 30 minutes 1½ liters of a solution containing 41 gms. of Na$_2$Cr$_2$O$_7$.2H$_2$O and 17.5 gms. of 100% H$_2$SO$_4$. A solution containing 5 gms. of rare earth acetate in 150 cc. is added immediately after strike which is followed by a solution of 10 gms. of aluminum sulphate (Al$_2$(SO$_4$)$_3$.18H$_2$O) in 150 cc. There is then added 8 gms. of soda ash and the pigment slurry is stirred for 5 minutes. Soda ash (14 gms.) is added to give a pH of 5.0 and the pigment is then filtered, washed and dried. 160 gms. of a primrose chrome yellow pigment being obtained as the product. This pigment was more resistant to darkening under the influence of light than a similar pigment which had not been treated with rare earth acetate.

*Example XIII*

To 149 gms. of lead nitrate in 4 liters of water at 38° C. is added, in the following manner, 1800 cc. of a solution containing 73 gms. of anhydrous sodium chromate and 1.4 gms. of caustic soda: the 1800 cc. of solution are split into two portions and each portion is added to the lead nitrate in 10 minutes with a stirring period of 20 minutes between each portion. The volume is then made to 10 liters and the precipitate washed four times by decantation. A solution of 7 gms. of aluminum sulfate $(Al_2(SO_4)_3.18H_2O)$ is added to the washed slurry followed by 1.4 gms. of $TiO_2$ as $TiOSO_4$. The mixture is then adjusted to a pH of 5.3 with 5.6 gms. of soda ash. Freshly prepared and well washed rare earth phosphate, precipitated from 9 gms. of rare earth acetate and enough tetra sodium pyro phosphate for complete precipitation of the rare earth phosphate, is added to the pigment slurry and stirred for 5 minutes. The pigment is washed by decantation and, after filtering and drying 155 gms. of a strong, brilliant medium yellow of improved lightfastness is obtained.

To demonstrate the improved resistance of a pigment obtained in accordance with this invention to darkening under the influence of light, I resort to a relatively simple test, well known and universally recognized by the art as useful for the purpose. In accordance with this test, a pigment is dispersed in an oily vehicle and the resulting composition is then coated on a supporting medium, such as a metal panel, in a thickness sufficient to completely hide the supporting medium. This coated panel is then exposed to light, either natural sunlight or an artificial source of light rich in the ultra-violet, for some specified period of time, and is then compared with a similar panel which has not been exposed to light. When both treated and untreated products are compared under identical conditions, the relative degree of darkening is readily observed.

To describe the test in more detail, the lead chromate pigments are rubbed out with lithographic varnish by the usual technique which is described in some detail by Henry A. Gardner on page 33 of the 9th edition of "Physical and Chemical Examination of Paints, Varnishes, Lacquers, Colors." The ratio of pigment to vehicle is approximately 2 parts of pigment to 1 part of vehicle but may vary somewhat from this figure depending upon the nature of the pigment. In any case, pigments being directly compared are rubbed at the same ratio of pigment to vehicle. The compositions (inks) resulting from this procedure are coated on a smooth metal panel by an applicator designed to give a film of approximately .005 inch in thickness. After these films have dried, they are exposed to the light of a carbon arc in an Atlas "Fadeometer" for a suitable period of time which may vary somewhat with the nature of the pigment but is always equal for any samples being directly compared. The exposed panels are then compared visually with duplicate panels which have been kept in the absence of any bright light and the relative degree of darkening is readily determined.

In order to more accurately describe the differences between the various pigments with respect to their resistance to darkening under the influence of light, panels of both exposed and unexposed pigment compositions have been examined in a General Electric Recording Photoelectric Spectrophotometer. This instrument measures the spectral reflectance of the pigment as a ratio of light reflection from the samples to be tested to light reflection from standard MgO under conditions of substantially equal illumination. A detailed description of this instrument and the methods for operating it appears at page 52 of "Physical and Chemical Examination of Paints, Varnishes, Lacquers, Colors" by Gardner, 9th edition, May 1939, and at pages 305–311, volume 25, September 1935, of the "Journal of Optical Society of America." The instrument is so constructed that the curves drawn at the time of measurement (which are continuous curves known as spectrophotometric curves) represent measures of the percent reflectance of the sample at the various wavelengths between 400 and 700 millimicrons. By use of the C. I. E. standard observer and coordinate system (more fully described by Judd in the Journal of the Optical Society of America, vol. 23, page 359 (1933)), values may be calculated from the spectrophotometric curves which describe the samples in much the same manner as they would appear visually to a normal observer. These values are known as dominant wavelength, (which is a measure of hue), excitation purity (which is a measure of the saturation of the color) and percent brightness (most nearly described as lightness or darkness). Since the visual evidence of change on exposure of any given sample of lead chromate pigments to light is that of an appearance of darkness, it may be anticipated that the principal change in the values calculated from the spectrophotometric curves will be in the percent brightness.

Figure 2:
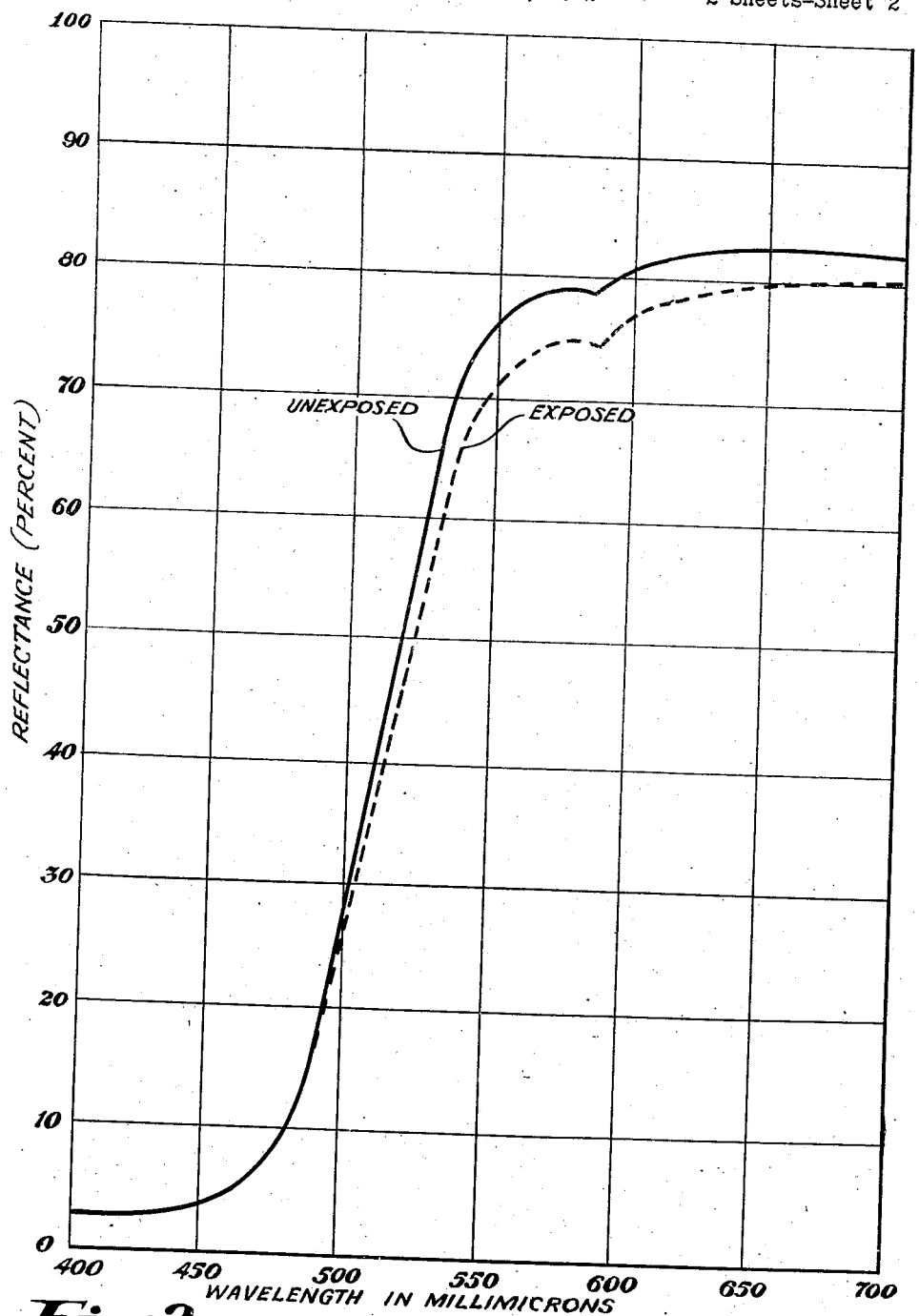

In the accompanying Figs. 1 and 2 of the drawings, illustrative spectrophotometric curves are shown, the solid lines in each instance representing the curve of a lead chromate pigment composition prior to exposure to light and the broken lines representing the curve of the same composition after it has been exposed to light. In particular, Fig. 1 comprises the curve of an untreated lead chromate pigment of the type disclosed in Example I, made exactly as described in said example, except that the final treatment with cerium nitrate was omitted. It will be observed that the dotted line, representing the product after exposure to light, is very much below the solid line. Fig. 2 represents the curve of the product of Example I, in which final treatment with cerium nitrate is effected. It will be observed that the dotted line, representing the product after exposure to light, is only very slightly below the solid line. It will be observed on the curves of the treated product that a noticeable dip in the curves at approximately 500 millimicrons takes place, and appears to be characteristic of products which have been treated with the rare earth salts.

The following table summarizes the dominant wavelength, excitation purity, and brightness as calculated from the curves shown in Figs. 1 and 2. It will be observed that the differences in dominant wavelength and excitation purity between the exposed and unexposed samples of the same product are relatively small. On the other hand, the differences in brightness are substantially larger in the case of the untreated products, the loss of brightness in the instance illustrated being approximately ⅙ that of its untreated control.

Table

|  | Dominant wavelength | Excitation purity | Brightness |
|---|---|---|---|
| Untreated: | | Per cent | Per cent |
| Unexposed | 576.3 | 86.1 | 67.7 |
| Exposed 48 hrs | 577.7 | 81.5 | 45.3 |
| Example 1: | | | |
| Unexposed | 574.6 | 83.0 | 69.2 |
| Exposed 48 hrs | 575.1 | 82.3 | 65.4 |

It will be evident from the foregoing that lead chromate pigments obtained in accordance with the invention, especially when treated successively with alumina hydrate, the hydrous oxide of titanium, and one or more hydrous oxides of the rare earth elements, exhibit very greatly improved resistance to darkening under the influence of light, and that the use of any combination of a rare earth element with one or more of the other contemplated treating agents will induce such marked improvement in pigment light-fastness. This advantageous result is of a wholly unexpected character because it exceeds that obtained from the additive effect of the separate agents. Most noticeable and exceedingly novel effects accrue when all three types of agents are used in combination. Hence, this latter combination is preferred. Since many uses of lead chromate pigments involve exposure to the effect of light and all prior lead chromate pigments darken perceptibly under such conditions to become progressively less attractive in their appearance, the present invention obviously enables one to obtain a highly valuable and superior type of lead chromate pigment since it will exhibit relatively complete freedom from darkening or at least markedly lessen this effect to such an extent that the degree of darkening, when compared to prior art yellows, will be so small as to be almost negligible.

The light-fastness of lead chromate appears to be largely a function of the photochemical behavior at the surface of the pigment particle. The exact manner in which the present invention functions to induce the remarkable effects which are attained herein is not presently clearly understood, but it appears that treatment of the pigment with a combination of the contemplated oxides or salts results in a more effective sealing of the particle surface of the pigment.

While I have described the invention as applied to certain specific and preferred embodiments, it is not, as already noted, to be construed as limited thereto. Considerable variance may therefore be had and the use of other forms, amounts and combinations of my novel form of treating agents may be resorted to without departing from its underlying spirit and scope. Thus, while the hydrous oxides of the elements aluminum, titanium and cerium are preferred for use herein, other compounds of these metals, especially the insoluble salts, such as the phosphates, molybdates, oxalates and carbonates, and other combinations of aluminum and/or fourth group elements adapted to form insoluble white oxides (titanium, zirconium, tin, silicon, hafnium or thorium) may be used in conjunction with the rare earth metals. I generically denominate these useful rare earth metals as either a "lanthanide" or a "metal of the rare earth type." As defined in Fritz Ephraim's Inorganic Chemistry (revised by Thorne & Ward), 3d English edition (1939), published by Nordeman Publishing Company, Inc., New York City, the terms specifically include scandium (Atomic No. 21), yttrium (Atomic No. 39) and the metals from lanthanum (Atomic No. 57) to lutecium (Atomic No. 71), inclusive, of the periodic system.

Generally, I contemplate employing in the invention either a two or three element combination in which the rare earth salt or hydrous oxide is always present as an essential ingredient. In the two-element combination I prefer to utilize the combination of aluminum and cerium or other rare earth salts, while in the three element combination, aluminum comprises the preferred first element with titanium and/or zirconium comprising the second element, and cerium or other rare earth salts comprising the third element.

Usually only relatively small or minor quantities of the treating agents need be employed in the invention, the cost of the resulting product controlling to a large extent the amount to be used. Thus, marked effects result when quantities of a rare earth metal or mixture as small as, say, about 0.15% of rare earth metal are employed, with increased light-fastness resulting when amounts ranging up to as high as, say, about 6% are used. The percentage range given is calculated as the oxide of the metal and on the basis of the dry weight of the finished pigment. Similarly, the amount of aluminum or fourth group metal oxides or salts, such as those of titanium, used in the invention in conjunction with the rare earth metal compound or compounds is not critical and is likewise subject to wide variance. Preferably, also, only relatively small quantities of these treating agents are employed. The amounts used in the examples have been selected and given merely because of the combination of desirable properties which the use of such amounts will be found to afford. Normally the quantity of oxide or oxides of these metals need not exceed about 2% (calculated as the oxide and based on the weight of the pigment) and is preferably in an amount which is equivalent to approximately 1%, based on the weight of the pigment. Lower amounts, say, as small as about 0.15%, or higher amounts, up to, say, 5 or 10% or greater (also calculated as the oxide and based on the weight of the pigment) may be used, if desired. Usually a total amount of all mixed oxides or salts employed as treating agents for a particular lead chromate pigment need not exceed, say, about 10-15%, calculated as the oxide and on the basis of the weight of the dry pigment.

While relatively soluble rare earth nitrate or acetate salts have been specifically mentioned as most desirable for use herein, other soluble rare earth salts, including the chlorates, chlorides, sulfates, etc., or insoluble salts (oxalates, phosphates, carbonates, molybdates, etc.) as well as mixtures of such rare earth salts, may be employed. Nitrate or acetate salts have been used because they are the most readily available forms, and the rare earth acetate mixture is preferred for use from an economic point of view. Rare earth acetate mixture contains about 48% cerium acetate, the remainder being a mixture of the acetates of lanthanum, praseodymium and neodymium, with possibly minor amounts of other elements. In addition to said rare earth acetate mixture and cerium salts, lanthanum salts are also effective, as are those of praseodymium, neodymium, samarium salts, yttrium salts and scandium salts. When insoluble compounds such as oxalates, phosphates, carbonates, molybdates, etc., of the rare earth metals are used, I have found it desirable to resort to a slight modification of the indicated preferred procedure. Thus, if the pigment slurry is given the usual treatment with aluminum salts and titanium salts, followed by adjustment of the pH to approximately 5.3–5.5 with soda ash, and the slurry is then treated with a freshly precipitated hydroxide, or insoluble salt of cerium or of the rare earth mixture, the resulting pigment will exhibit definite improvements in respect to light-fastness over pigments which have not been so treated with rare earth elements.

It is well known that some chrome yellows undergo a definite crystal change subsequent to the precipitation of the lead chromate and that other pigments undergo very little, if any, crystal change at this step in the process. It is generally assumed that most, if not all, lead chromate pigments are precipitated as rhombic crystals. Those which undergo no further crystal change remain as rhombic crystals and include the yellows commonly known as primrose and lemon yellows. On the other hand, those usually known as medium yellows and excelsior yellows undergo a crystal change which is commonly believed to be to the monoclinic form. I have found it desirable that the rare earth salts not be present during the crystal change from the rhombic to the monoclinic form. In the case of medium the excelsior yellows, I have found it expedient to add the rare earth agent after the crystal change or, preferably, as the last step in the process. In the instance of primrose and lemon yellows, in which no crystal change takes place, I prefer to add the rare earth salts early in the process, even before precipitation of the lead chromate. In addition, I have found that the insoluble salts, such as the phosphates, molybdates, oxalates or carbonates, may be used with substantially equal effectiveness to the water-soluble salts. I have also found that with this type of yellow, most optimum results accrue when a portion of the rare earth salt is added before the precipitation of the pigment and the remainder immediately afterwards.

While aluminum sulfate comprises a preferred type of soluble salt from which hydrous aluminum oxide is obtained, this has been used because of its reactivity, low cost and availability. Obviously, other water-soluble salts of aluminum may be employed in lieu thereof, such as aluminum nitrate, or the various halogen salts of aluminum, including the chloride, bromide, iodide, etc., both simple and complex.

Similarly, while titanyl sulfate comprises a preferred type of soluble titanium salt for use in the invention, other forms of titanium salts, such as the sulfate, chloride, nitrate, etc., or mixtures of such salts, may also be employed in the invention.

The order and manner in which the combination of rare earth element with either or both aluminum and titanium becomes intimately associated with a lead chromate pigment to improve the light-fastness characteristics of the latter is not critical in the invention and hence the order and manners of addition specified are merely preferred because, as a result, optimum benefits and advantages accrue. Therefore, while said agents are preferably successively added to or incorporated in the pigment under treatment, they may be separately prepared and then intimately associated with the pigment after precipitation of the latter, or may be concurrently or separately precipitated on such pigment. When optimum tinctorial properties, such as improved mass tone, together with improved light-fastness, are desired, the rare earth treating agent is preferably associated with the pigment subsequent to addition of the aluminum and/or titanium treating agents. Alternatively, the treating agents of this invention may be blended or otherwise associated with the pigment during preparation of a coating composition, in which said pigment forms an essential component of said composition. Thus, the treating agents may be introduced separately or concurrently with the pigment into a suitable coating composition vehicle, especially a printing ink, containing a small amount (about 5%) of an aqueous medium, such as water, and the resulting mixture subjected to the usual grinding procedure involved in preparing such compositions.

In the final step of precipitation of the hydrous oxide with an alkaline agent, such as sodium carbonate, it will be found necessary that sufficient alkali be added to raise the pH of the mixture to at least about 4.2 before any substantial improvement in light-fastness will result. Optimum light-fastness usually results when the pH of the mixture is raised to about 5.5 and hence this value comprises a preferred one for use in the invention. In order to obtain complete precipitation of the rare earth salts, however, it will be found necessary to raise the suspension to a pH of at least 6.4. Hence, the use of pH ranges of at least 4.2 and from about 5.0 to pH 9.0 is contemplated in the invention, a preferred practical range being, as already indicated, from pH 5.5 to pH 6.5.

The term "lead chromate," used herein and in the appended claims, includes all varieties and types of lead chromate pigments denominated in the art as "chrome yellows," particularly those consisting essentially of lead chromates with varying quantities of lead sulfate, carbonate and diluents. Chrome yellows are obtainable in a great variety of shades, varying from sulfur yellow to dark orange or a so-called chrome red. These shades depend upon and vary with the composition and degree of subdivision existing in each. Thus, light shades are obtained when dilute solutions with formation of mixed crystals of lead chromate and lead sulfate are used, whereas medium shades are in the form of neutral lead chromate. The dark shades are produced from basic lead chromate. Similarly, the term includes the so-called chrome greens, consisting essentially of mixtures of lead chromate or chrome yellow with well-known blues, such as Prussian, Chinese or Milori Blue, and suitable diluents. The term also includes the so-called molybdated oranges, consisting essentially of lead chromate, lead sulfate and lead molybdate, as more particularly described in U. S. Patent 1,926,447. The term "chrome yellow" also includes other forms of inorganic chrome pigments as, for example, the chromates of barium and strontium.

I claim as my invention:

1. A process for producing an improved lead chromate pigment comprising intimately associating with said pigment minor amounts of insoluble compounds of a metal from the group consisting of aluminum and an element from the fourth group of the periodic table adapted to yield substantially white, insoluble oxides, together with an insoluble compound of a metal of the rare earth type.

2. A process for producing an improved lead chromate pigment exhibiting increased fastness towards light which comprises intimately associating with said pigment small amounts of hydrous, white oxides of a metal from the group consisting of aluminum and an element from the fourth group of the periodic table, together with a hydrous oxide of a metal of the rare earth type.

3. A process for improving the light-fastness of a lead chromate pigment comprising intimately associating with said pigment small amounts of aluminum and rare earth metal hydrous oxides.

4. A process for improving the light-fastness of a lead chromate pigment comprising intimately associating with said pigment small amounts of the hydrous oxides of aluminum, titanium and a rare earth metal.

5. A process for improving the light-fastness of a lead chromate pigment which comprises precipitating on said pigment a small amount of the hydrous oxides of aluminum and cerium.

6. A process for improving the light-fastness of a lead chromate pigment which comprises precipitating on said pigment a small amount of the hydrous oxides of aluminum, titanium and cerium.

7. A process for producing a lead chromate pigment exhibiting improved light-fastness comprising mixing a slurry suspension of said pigment with a soluble salt of a metal from the group consisting of aluminum and an element from the fourth group of the periodic table adapted to yield substantially insoluble white oxides, together with a compound of a metal of the rare earth type, and then precipitating small amounts of the hydrous oxides of said metal compounds on said pigment by adjusting the pH value of the resulting mixture through introduction of a sufficient quantity of an alkaline agent.

8. A process for producing a lead chromate pigment of improved light-fastness which comprises intimately associating with said pigment a mixture of soluble salts of aluminum, titanium and rare earth types of metals, adjusting the pH value of the resulting mixture by introducing therein a sufficient amount of an alkaline agent, whereby precipitation on said pigment is effected of small amounts of the hydrous oxides of said metals.

9. A process for producing a lead chromate pigment of improved light-fastness comprising treating a slurry suspension of said pigment with small amounts of aluminum sulfate, titanyl sulfate and rare earth acetate, and then precipitating small amounts of the hydrous oxides of said metal on said pigment by adjusting the pH value of the resulting mixture to from about 5.0 to 6.5 through addition thereto of sufficient sodium carbonate.

10. A process for producing a lead chromate pigment exhibiting improved light-fastness which comprises intimately associating with said pigment from about .3% to 2% of a hydrous oxide of a metal from the group consisting of aluminum and an element from the fourth group of the periodic table adapted to yield white, insoluble oxides and from about 0.15% to about 6% of a hydrous oxide of a metal of the rare earth type, said percentage amounts being calculated as the oxide and on the basis of the dry pigment.

11. A process for producing a lead chromate pigment exhibiting improved light-fastness which comprises intimately associating with said pigment from about .3% to 3% of a hydrous oxide of a metal from the group consisting of aluminum and an element from the fourth group of the periodic table adapted to yield white, insoluble oxides and from about 0.15% to about 6% of a hydrous oxide of a metal of the rare earth type, said percentage amounts being calculated as the oxide and on the basis of the dry pigment.

12. A process for producing a lead chromate pigment exhibiting improved light-fastness which comprises intimately associating with said pigment from about .3% to 2% of hydrous aluminum oxide and from about 0.3% to 3% of hydrous cerium oxide, said amounts being calculated on the basis of the oxides of said metals and on the weight of the dry pigment.

13. A process for producing a lead chromate pigment exhibiting improved light-fastness which comprises intimately associating with said pigment from about .3% to 2% of the hydrous oxides of aluminum and titanium and from about 0.3% to 3% of the hydrous oxide of cerium, said amounts being calculated as the oxide and based on the weight of the dry pigment.

14. A chrome yellow pigment containing as essential ingredients a small amount of an insoluble compound of a metal of the rare earth type, together with a small amount of an insoluble compound of a metal from the group consisting of aluminum and an element from the fourth group of the periodic table adapted to yield substantially insoluble, white, hydrous oxides.

15. A lead chromate pigment containing as an essential ingredient a minor amount of a hydrous oxide of a metal of the rare earth type, together with a minor amount of a hydrous oxide of a metal from the group consisting of aluminum and an element from the fourth group of the periodic table adapted to yield white, insoluble, hydrous oxides.

16. A substantially light-resistant lead chromate pigment containing as an essential ingredient small amounts of hydrous aluminum oxide, together with a small amount of an insoluble compound of a metal of the rare earth type.

17. A substantially light-resistant lead chromate pigment containing as an essential ingredient a minor amount of the hydrous oxides of aluminum and titanium, together with an insoluble compound of a metal of the rare earth type.

18. A lead chromate pigment of improved light-fastness characteristics containing from about 0.15% to about 6% of a hydrous oxide of a metal of the rare earth type, together with from about .3% to 2% of a hydrous oxide of a metal from the group consisting of aluminum and an element from the fourth group of the periodic table adapted to yield white, insoluble oxides, said percentage amounts being calculated as the oxide and based on the weight of the dry pigment.

19. A lead chromate pigment exhibiting improved light-fastness characteristics containing from about 0.3% to 3% of a hydrous oxide of a rare earth metal and from about .3% to 2% of a hydrous oxide of aluminum and titanium.

20. A lead chromate pigment exhibiting improved light-fastness characteristics containing from about 0.3% to 3% of precipitated hydrous cerium oxide, together with from about .3% to 2% of the precipitated hydrous oxides of aluminum and titanium.

EDMOND CHARLES BOTTI.